Dec. 3, 1968   K. MacGREGOR SWANSON   3,414,474
NUCLEAR REACTOR FUEL ELEMENTS
Filed Dec. 19, 1966
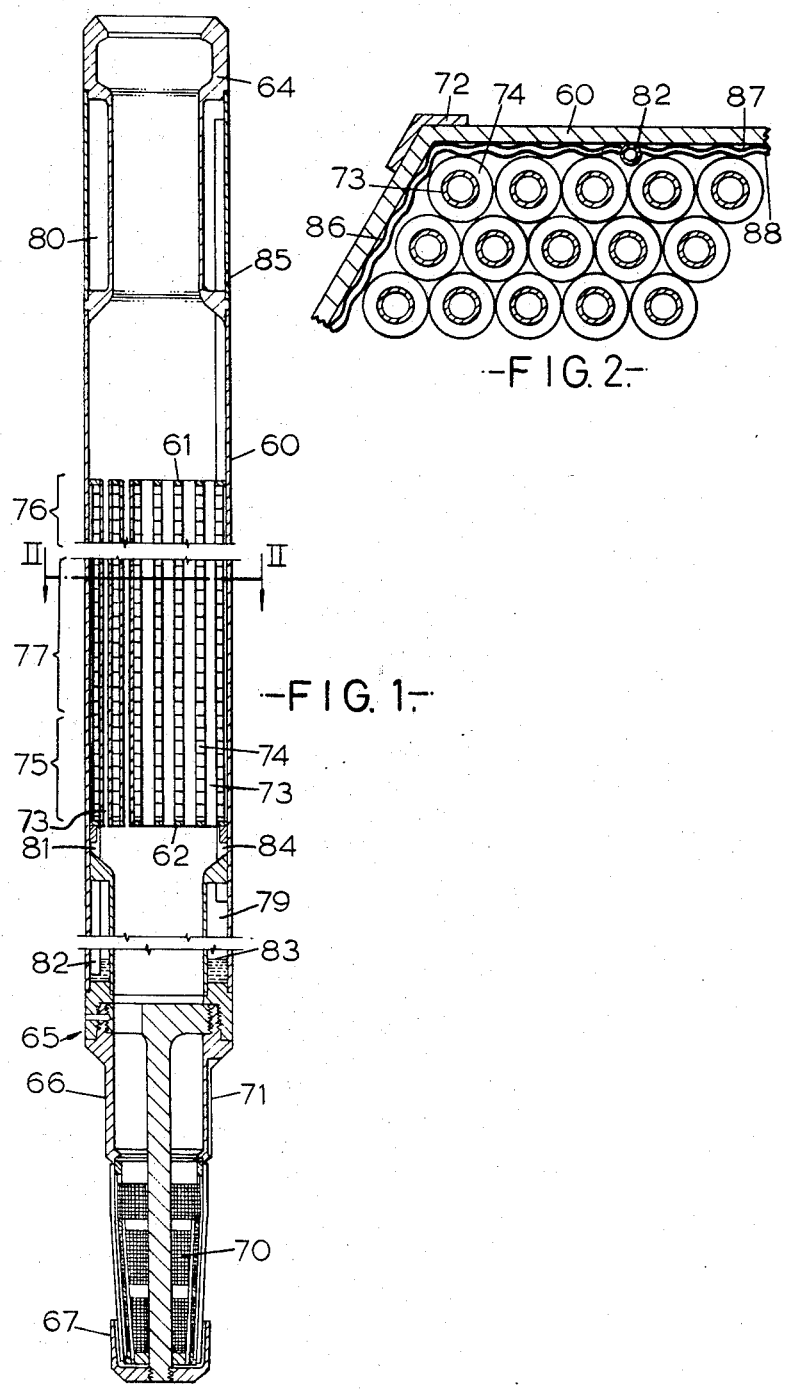

United States Patent Office 3,414,474
Patented Dec. 3, 1968

3,414,474
NUCLEAR REACTOR FUEL ELEMENTS
Kenneth MacGregor Swanson, Thurso, Caithness, Scotland, assignor to United Kingdom Atomic Energy Authority, London, England
Filed Dec. 19, 1966, Ser. No. 602,824
Claims priority, application Great Britain, Aug. 8, 1966, 35,465/66
5 Claims. (Cl. 176—68)

ABSTRACT OF THE DISCLOSURE

A fast nuclear reactor fuel element has sheathing forming an external and an internal wall, both exposed to the same flowing coolant, ceramic nuclear fuel contained in the sheathing and having a density less than maximum theoretical so as to provide distributed voidage in the fuel, the fuel closely contacting the inner face of the internal wall while a growth-accommodating gap exists between the fuel and the inner face of the external wall, the gap serving to insulate the fuel from the external wall so that its operating temperature is raised compared with that of the fuel contacting the internal wall which thus lowers the compressive creep resistance of the fuel and induces irradiation-induced swelling to be absorbed in the distributed voidage of the fuel. The gap can have crinkled foil of a refractory metal within it to partially support the fuel, and the external sheathing wall can constitute a shell containing coolant tubes forming the sheathing internal wall and on which columns of hollow fuel pellets can be stacked.

---

The present invention concerns nuclear reactor fuel elements having ceramic fuel in metallic sheathing; the fuel elements contemplated by the invention are particularly suitable for use in fast reactors. A ceramic fuel is a refractory chemical compound of uranium, plutonium or both, with or without added non-fissile compounds. Current research on ceramic fuels, such as mixed uranium/plutonium dioxide and monocarbide, is showing that fuel swelling in fast reactors can be a prime cause of fuel element sheathing failure and thereby produce a limit on attainable burn-up of heavy atoms. There are strong economic incentives to achieve as high a fraction of heavy burn-up as possible in fast reactors.

It is an object of the invention to mitigate the effects of irradiation-induced swelling in the fuel and so enable the burn-up limit to be increased.

In one of its aspects, the invention provides a nuclear reactor fuel element containing ceramic fuel which element presents cooled surfaces internally as well as externally; both surfaces are sheathed but the external surface is separated from its sheathing by a growth accommodating gap. This gap acts additionally in a thermal insulating role to increase the design operating temperature of the external surface above that of the internal surface. What is thereby achieved is an increase in the proportion of the fuel in the element which, by virtue of thermally-induced lowering of creep-resistance, is brought to a condition allowing, in conjunction with voidage in the fuel, an internal absorption of the fuel swelling. The sheathing can therefore be relieved of the forces which have been responsible for its failure.

Present indications are that an external fuel surface temperature not below 1000° C. would be appropriate to ensure an adequate degree of plasticity in a fuel like a fissile dioxide. In an elongated element it is generally not feasible or even necessary to aim for such a high surface temperature towards the ends of the element. Typically there is a downward temperature gradient towards the ends which results from a lowering of neutron flux density and hence fission rate in the fuel. The lower fission rate implies less swelling tendency and hence less need for measures to avoid swelling. The main aim should therefore be to obtain the 1000° C. minimum temperature at least in the maximum burn-up region of the element; such region is typically at the mid-length of the fuelled section of an elongated element. With sheathing of metal, such as stainless steel or a nickel alloy, the gap at the external surface will have to be appropriate for bringing about a high temperature drop across the fuel from the external to the internal suface. The thermal insulating effect of the gap may be enhanced by reflective material arranged in such a manner as to bear only intermittently against the fuel and the external sheathing and so leave gas gaps or pockets; such material is preferably of refractory metal in the form for example either of a foil, typically of molybdenum, which is crinkled or corrugated, or of a reticulated sheet or wire mesh. Such material may also serve to avoid significant redistribution of fuel within the element by acting to provide some degree of location for fuel which undergoes expansion into the growth accommodating gap.

Fuel elements in accordance with the invention may be constructed in tubular form, that is to say, with coaxial inner and outer sheaths and fuel in the space between them, but preferably they are constructed in a form which is rather like a calandria in that a fuel container or shell is penetrated by a plurality of coolant flow tubes which represent the internal surface sheathing. The latter constructional form is conveniently called a "tube-in-shell" fuel element, and it has the advantage over the tubular form that the volume fraction of sheathing material can be less.

The invention will be further described with reference to the particular example illustrated in the accompanying drawings in which:

FIG. 1 is a longitudinal section, and
FIG. 2 is a scrap transverse section taken on line II—II of FIG. 1 to an enlarged scale.

The illustrated fuel element has been designed for a fast reactor cooled by a low melting point metal assumed for the purposes of the present example to be sodium. The sheathing of the element comprises an external hexagonal shell 60 within which a compartment is defined between upper and lower partitions 61 and 62 constructed in the manner of tube plates. Surmounting the shell there is a top fitting 64 and at the opposite end there is a bottom fitting 65 comprising spaced cylindrical bearing surfaces 66 and 67 for fitting into a socket of a reactor core support structure. Between the bearing surfaces 68 and 69 there is a stainless steel knitmesh filter 70 which enables coolant from an inlet planum incorporated into the reactor core support structure to enter into the bottom of the shell 60 and to be forced to flow upwards therein for internal cooling. For external cooling a flow of coolant is allowed to pass between the cylindrical bearing surface 66 and the complementary engaging surface of the socket in which the fuel element is fitted; appropriate tolerances on these surfaces may suffice to establish the requisite external cooling flow but, as illustrated, it may be preferred to utilise preformed passages as represented by the groove indicated at 71. Only narrow gaps are available between the element and its neighbours in the core, these gaps being predetermined by the pitch of the sockets in the reactor core support structure and by corner abutment such as 72 (FIGURE 2) projecting from the shell 60 at one or more positions along the length of the element. Apart from the corner abutments, these gaps are unobstructed and therefore the external cooling flow of coolant proceeds through these gaps as a relatively thin flowing layer of which the flowrate is preset, as by the grooves 71, to obtain an outlet temperature close to that of the internal cooling flow.

Between the partitions 61 and 62 extend open-ended coolant tubes, such as 73, arranged in a parallel relationship on a triangular pitch. These tubes are sealed at their ends to the partitions so that the internal flow of coolant proceeds up the coolant tubes and is excluded from the space between the tubes. In this space there is fuel and breeder material in the form of annular pellets, such as 74, threaded or strung on the coolant tubes so as to be stacked in juxtaposed columns. In order that the element may have upper and lower breeder sections 75 and 76 the pellets in these sections are of breeder material. Between these breeder sections the pellets are of fuel to form a fuel section 77. The fuel section is longer than the upper and lower breeder sections. In order that the shell does not have to be exposed to internal pressures built up by gases released from the fuel in service, the space between the tubes is adapted for venting of these gases, preferably to the coolant.

Adjacent both the top and bottom fittings 64 and 65 the shell is of double wall construction to form a scrubber chamber 79 and a lute chamber 80. The small bore vent pipe 81 lying against the inner surface of the shell 60 has a bottom end 82 opening into the scrubber chamber beneath a free surface 83 of a scrubber liquid contained in this chamber. This liquid is conveniently sodium for the retention of caesium fission products but other liquids could be used according to the products sought to be retained. Remote from the bottom end 82, the vent pipe 81 opens into the fuel section 77. The vent path is completed by a second vent pipe 84, which opens at opposite ends respectively into the upper regions of the scrubber and lute chambers, and by several apertures, such as the one indicated at 85, by which a lower region of the lute chamber is placed in communication with the outside of the shell and hence with the flow of coolant.

The volume of the lute chamber must be such that coolant entering through the apertures 85 at full load pressure cannot reach the top of the second vent pipe 84 by compression of gas in the vent path, even where such gas is cold. Consequently the combination of second vent pipe and lute chamber acts in the manner of a diving bell to ensure that coolant cannot proceed further back along the vent path than the lute chamber. However the gases released from the fuel can bubble through the scrubber liquid from the bottom 82 of the vent pipe 81 and by depression of the level of coolant in the lute chamber to the level of the apertures 85 can ultimately escape to the flowing coolant outside the element.

Considering the fuel section in greater detail, it will be seen by reference to FIG. 2 that the pellets 74 to not engage the wall of the shell but in fact are spaced from this wall in order to leave a gap 86 which may be as much as one tenth of an inch even where the gap width is a minimum. In this gap there are two foils 87 and 88, these being crinkled foils of molybdenum preferably only about 0.002 inch thick. In conjunction with this measure to increase fuel temperatures, there must be voidage in the fuel itself. Based on the provision of between 1 and 2% voidage per designed percent maximum burn-up of heavy atoms, an aggregate voidage amounting to at least 15% of the fuel volume is considered appropriate. This voidage may be included as microporosity in the fuel, this being obtainable by sintering to less than theoretical density and/or by adjustment of the packing density of fuel in the form of powder or granules. In the example illustrated in the drawings where pelleted fuel is employed, the gaps left between the pellets represents useful voidage because the fuel bounding these gaps is at high temperature and therefore hot enough to be in the so-called "soft" state which allows squeezing into the gaps. By using annular pellets in contact with one another on a triangular lattice as in FIG. 2, the gaps between pellets provide a voidage of about 10%. Extra voidage is obtained by less than theoretical density in the pellets themselves. Thus 90% dense pellets would achieve a total voidage content of about 20%, that is to say, an overall fuel density of about 80% of the maximum theoretical density.

For the purposes of the present example the fuel is assumed to be $(UPu)O_2$, possibly to a slightly non-stoichiometric composition, and the sheathing represented by the shell, partitions and coolant tubes is of stainless steel. Examples of other ceramic fuels are the carbides, nitrides and silicides. Although the gap left between the fuel and the external sheathing represented by the shell allows the fuel some freedom for outward growth, there exists at least in the region of maximum burn-up along the length of the fuel element a situation which is effectively that all the fuel, with the exception of rims surrounding the coolant tubes, is so hot when operating at the design heat output rating that the compressive creep strength is greatly reduced and sufficient plasticity is thereby induced for swelling to be accommodated in virtually any direction where voidage is available. Whilst some expansion of the fuel into the gap is to be expected, and is allowed for, the expansion should be less than if the temperature gradient toward the external sheathing were more like the gradient towards the internal sheathing. In the rims around the internal sheathing where lower temperature, and hence higher creep resistance, prevail the fact that expansion may occur is not damaging to the sheathing since it tends to be outwards rather than inwards. An indication of the extent to which the compressive creep strength of ceramic fuels is reduced with increasing temperature can be gained from the paper by Armstrong et al. at pages 133 to 141 of Journal of Nuclear Materials, 7, No. 2 (1962).

It follows from the insulation function of the gap that most of the heat output of the fuel is removed at the internal sheathing represented by the tubes rather than at the external sheathing. Possibly as little as 2% may be removed at the external sheathing when considered over the fuel element as a whole or at least over the maximum burn-up region. Such a figure implies a high degree of insulation by the gap and a tendency towards very high fuel temperatures. Against this the common design stipulation would be observed that the melting temperature is not substantially exceeded when operating at the design heat output rating.

What I claim is:

1. A fuel element for a fast nuclear reactor comprising sheathing presenting internal and external walls for exposure to a common flowing coolant, substantially unmoderated ceramic nuclear fuel contained in said sheathing and closely contacting the inner face of said internal wall, said fuel having a density which is less than 85% of the maximum theoretical density so as to include distributed voidage, and a growth accommodating gap between said fuel and the inner face of the external wall of said sheathing for acting as thermal insulation to increase the operating temperature of the fuel adjacent the external wall to at least 1000° C. and above that of the fuel portion adjacent said internal wall so as to lower the compressive creep resistance of the fuel and thus induce absorption of irradiation-induced swelling of the fuel in said distributed voidage of said fuel.

2. A fuel element according to claim 1, including material disposed in said gap to contact the inner face of said external wall at spaced positions.

3. A fuel element according to claim 2, wherein said material is a crinkled foil of a refractory metal.

4. A fuel element according to claim 1, wherein the external wall of the sheathing provides a shell, the internal wall of the sheathing is constituted by a plurality of coolant tubes within the shell, and the ceramic fuel comprises apertured pellets threaded onto said coolant tubes in columns and shaped for providing engagement between columns over only a portion of the column peripheries.

5. A fuel element according to claim 4, including crinkled foil of a refractory metal disposed between said shell and the columns of apertured pellets adjacent thereto.

References Cited

UNITED STATES PATENTS

| | | | |
|---|---|---|---|
| 3,072,555 | 1/1963 | Barth et al. | 176—68 X |
| 3,156,625 | 11/1964 | Harty et al. | 176—72 X |
| 3,291,699 | 12/1966 | Trickett et al. | 176—69 X |
| 3,331,746 | 7/1967 | Margen | 176—72 X |

FOREIGN PATENTS

| | | |
|---|---|---|
| 798,282 | 7/1958 | Great Britatin. |
| 928,517 | 6/1963 | Great Britain. |

CARL D. QUARFORTH, *Primary Examiner.*

MELVIN J. SCOLNICK, *Assistant Examiner.*